(12) United States Patent
Wang

(10) Patent No.: US 11,960,696 B2
(45) Date of Patent: Apr. 16, 2024

(54) ELECTRONIC DEVICE HAVING MULTIPLE PROCESSING UNITS AND MULTIPLE MEMORY UNITS, AND PROCESSING METHOD THEREOF

(71) Applicant: Lenovo (Beijing) Limited, Beijing (CN)

(72) Inventor: Ke Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 97 days.

(21) Appl. No.: 17/691,100

(22) Filed: Mar. 9, 2022

(65) Prior Publication Data
US 2023/0088460 A1    Mar. 23, 2023

(30) Foreign Application Priority Data
Sep. 22, 2021    (CN) ........................ 202111106570.5

(51) Int. Cl.
*G06F 3/0481*    (2022.01)
(52) U.S. Cl.
CPC .. *G06F 3/0481* (2013.01); *G06F 2203/04803* (2013.01); *G09G 2340/0407* (2013.01); *G09G 2354/00* (2013.01)

(58) Field of Classification Search
CPC ....................................................... G06F 3/0481
USPC ............................................. 345/418; 463/31
See application file for complete search history.

(56) References Cited

U.S. PATENT DOCUMENTS

| | | | | |
|---|---|---|---|---|
| 2014/0349748 | A1* | 11/2014 | Haberman | A63F 13/86 463/31 |
| 2018/0357748 | A1* | 12/2018 | Li | G06T 3/4092 |
| 2019/0235692 | A1* | 8/2019 | Sarnoff | G06F 3/04883 |
| 2020/0278822 | A1* | 9/2020 | Kwon | G06F 3/1423 |
| 2020/0286449 | A1* | 9/2020 | Yang | G02B 27/01 |
| 2021/0327122 | A1* | 10/2021 | Schmalstieg | G06T 15/405 |

* cited by examiner

*Primary Examiner* — Prabodh M Dharia
(74) *Attorney, Agent, or Firm* — ANOVA LAW GROUP, PLLC

(57) ABSTRACT

A display method. The method includes dividing at least one underlying graphics sub-resource corresponding to a parameter of a split-screen instruction in an underlying graphics resource; generating at least one virtual display screen based on the parameter corresponding to the split-screen instruction and attribute information of a default virtual display screen of an electronic device; and displaying content in the at least one underlying graphics sub-resource on a display screen of the electronic device based on the attribute information of the at least one virtual display screen.

18 Claims, 7 Drawing Sheets

```
On the display screen of the electronic device, display the content corresponding to a    / S301
        first operation on any one of the virtual display screens
```

FIG. 7

```
Adjust display parameters of the at least two virtual display screens based on the    / S401
                      attribute information of the content
```

FIG. 8

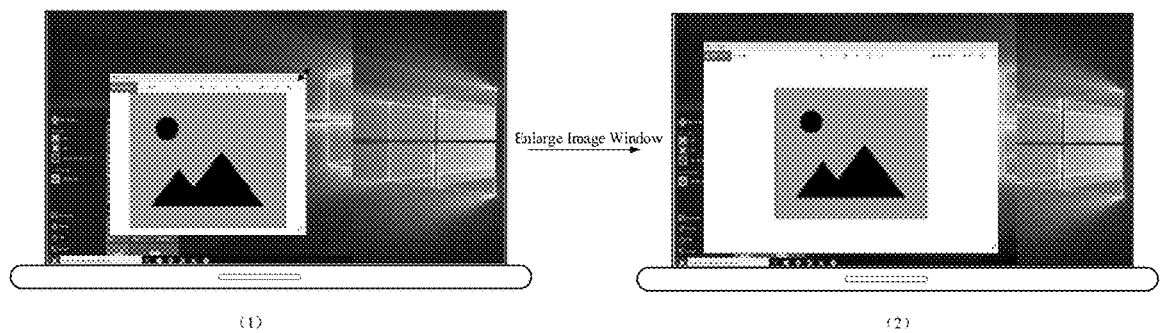

FIG. 9

```
Display the content on the at least two virtual display screens in response to the display    / S501
                              position of the content
```

FIG. 10

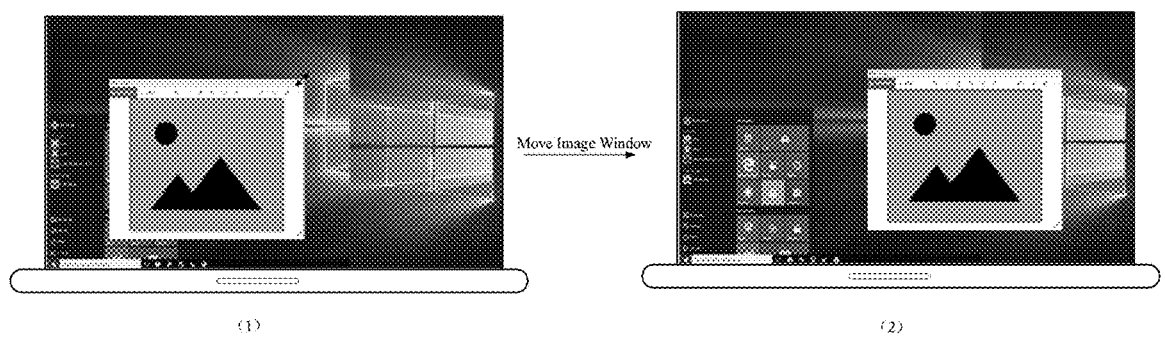

FIG. 11

ELECTRONIC DEVICE HAVING MULTIPLE PROCESSING UNITS AND MULTIPLE MEMORY UNITS, AND PROCESSING METHOD THEREOF

CROSS-REFERENCES TO RELATED APPLICATION

This application claims priority to Chinese Patent Application No. 202111106570.5 filed on Sep. 22, 2021, the entire content of which is incorporated herein by reference.

FIELD OF TECHNOLOGY

The present disclosure relates to the field of computer technology and, more specifically, to a display method and a display device.

BACKGROUND

For application scenarios where multi-screen display is required, the multi-screen display can be realized by connecting external display screens to an electronic device. However, this type of expansion is not only cumbersome, but also unfavorable for user operation and viewing. Therefore, there is a need to improve screen splitting on a display of an electronic device.

BRIEF SUMMARY OF THE DISCLOSURE

One aspect of the present disclosure provides a display method. The method includes dividing at least one underlying graphics sub-resource corresponding to a parameter of a split-screen instruction in an underlying graphics resource; generating at least one virtual display screen based on the parameter corresponding to the split-screen instruction and attribute information of a default virtual display screen of an electronic device; and displaying content in the at least one underlying graphics sub-resource on a display screen of the electronic device based on the attribute information of the at least one virtual display screen.

Another aspect of the present disclosure provides a display device. The device includes a dividing unit configured to divide at least one underlying graphics sub-resource corresponding to a parameter of the split-screen instruction in an underlying graphics resource; a generating unit configured to generate at least one virtual display screen based on the parameter corresponding to the split-screen instruction and attribute information of a default virtual display screen of an electronic device; and a display unit configured to display content in the at least one underlying graphics sub-resource on a display screen of the electronic device based on the attribute information of the at least one virtual display screen.

Another aspect of the present disclosure provides a non-transitory computer-readable storage medium containing computer-executable instructions for, when executed by one or more processors, performing a display method. The method includes dividing at least one underlying graphics sub-resource corresponding to a parameter of a split-screen instruction in an underlying graphics resource; generating at least one virtual display screen based on the parameter corresponding to the split-screen instruction and attribute information of a default virtual display screen of an electronic device; and displaying content in the at least one underlying graphics sub-resource on a display screen of the electronic device based on the attribute information of the at least one virtual display screen.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

FIG. 7 is a flowchart of the display method according to an embodiment of the present disclosure.

FIG. 8 is a flowchart of the display method according to an embodiment of the present disclosure.

FIG. 9 is a schematic diagram of adjusting display parameters of at least two virtual display screens based on attribute information of content according to an embodiment of the present disclosure.

FIG. 10 is a flowchart of the display method according to an embodiment of the present disclosure.

FIG. 11 is a schematic diagram of displaying the content on at least two virtual display screens in response to a display position of the content according to an embodiment of the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

When using an electronic device with only one display screen, users may want to be able to watch videos or play slideshows in full screen in part of the display screen, and open other applications in another area of the display screen.

In conventional technology, generally a discrete graphics card is used to address the need described above. However, due to compatibility issues, discrete graphics cards of different brands cannot be supported, and only certain graphics card can support this function, therefore, this technical solution is limited.

In view of the issues in the conventional method for splitting the screen of an electronic device, embodiments of the present disclosure provide a display method to improve the conventional screen splitting method.

Figure 1:
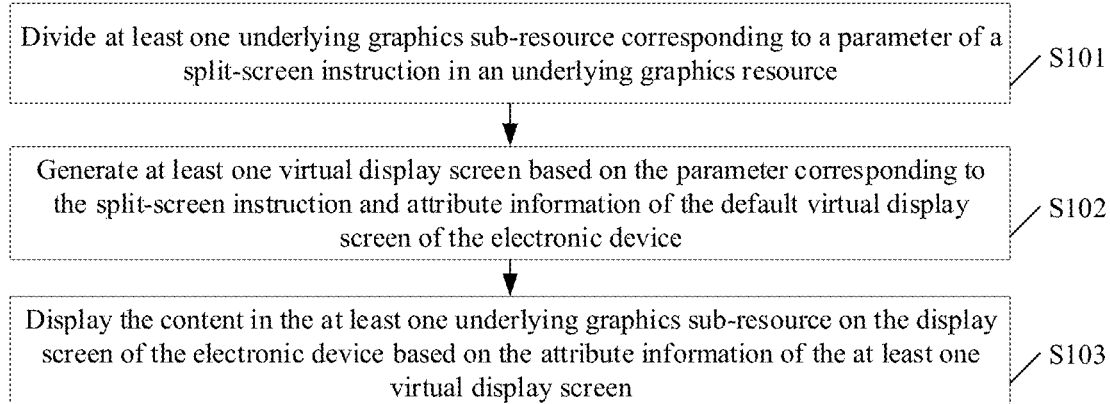
FIG. 1 is a flowchart of a display method according to an embodiment of the present disclosure.

FIG. 1 is a flowchart of a display method according to an embodiment of the present disclosure. The method will be described in detail below.

101, dividing at least one underlying graphics sub-resource corresponding to a parameter of a split-screen instruction in the underlying graphics resource.

In some embodiments, in response to a split-screen instruction, a display device (hereinafter referred to as the device) may divide at least one underlying graphics sub-resource corresponding to the parameter of the split-screen instruction in the underlying graphics resource of the electronic device. In some embodiments, the underlying graphics resource may include memory resources corresponding to a virtual reality screen, and may include the memory of the electronic device and the memory of the graphics card.

During implementation, the device may be configured to divide at least one underlying graphics sub-resource equal to the number of sub-screens corresponding to the split-screen instruction in the underlying graphics resource other than the underlying graphics resource corresponding to the default virtual display screen.

102, generating at least one virtual display screen based on the parameter corresponding to the split-screen instruction and attribute information of the default virtual display screen of the electronic device.

In some embodiments, the device may be configured to determine the seize and/or resolution of the at least one virtual display screen based on the parameter corresponding to the split-screen instruction and the size and/or resolution of the default virtual display screen of the electronic device, and generate the at least one virtual display screen based on the size and/or resolution of the at least one virtual display screen. In some embodiments, the sum of the sizes of all virtual display screens may be less than or equal to the size of the default virtual display screen, and/or, the sum of the resolutions of all virtual display screens may be less than or equal to the size of the default virtual display screen.

In some embodiments, the default virtual display screen may be a virtual display screen corresponding to full screen display (i.e., when the screen is not split) of the electronic device based on the display screen. The attribute information of the default virtual display screen may include the size of the default virtual display screen and/or the resolution of the default virtual display screen. In some embodiments, the display screen of the electronic device may be a display (i.e., a hardware device) of the electronic device, the default virtual display screen may be a virtual display screen corresponding to the display screen, and the size and/or resolution of the default virtual display screen may be the same as the size and/or resolution of the display part included in the display screen.

103, displaying the content in the at least one underlying graphics sub-resource on the display screen of the electronic device based on the attribute information of the at least one virtual display screen.

In some embodiments, the device may be configured to transfer the content in at least one underlying graphics sub-resource to the underlying graphics resource corresponding to the default virtual display screen; perform synthesize processing on the content in at least one underlying graphics sub-resource based on the relative position between the at least one virtual display screen, and the size and/or resolution of the at least one virtual display screen; and display the synthesized content on the display screen of the electronic device.

In some embodiments, the content in at least one underlying graphics sub-resource may have a shared attribute.

Consistent with the present disclosure, by dividing at least one underlying graphics sub-resource corresponding to the parameter of the split-screen instruction in the underlying graphics resource, generating at least one virtual display screen based on the parameter corresponding to the split-screen instruction and the attribute information of the default virtual display screen of the electronic device, and displaying the content in the at least one underlying graphics sub-resource on the display screen of the electronic device based on the attribute information of the at least one virtual display screen, the split-screen can be implemented on the display screen of the electronic device.

Figure 2:
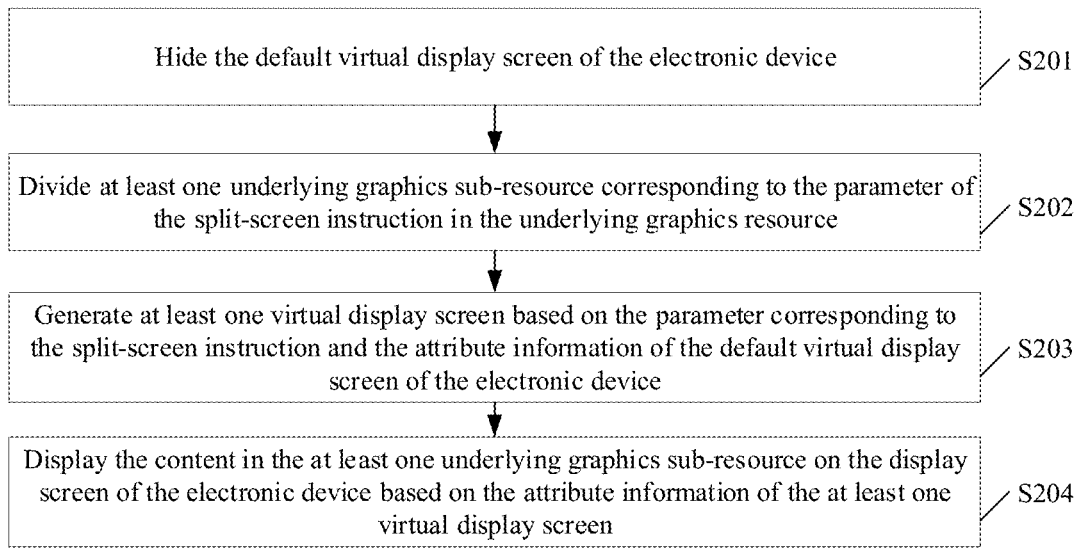
FIG. 2 is a flowchart of the display method according to an embodiment of the present disclosure.

FIG. 2 is a flowchart of the display method according to an embodiment of the present disclosure. The method will be described in detail below.

201, hiding the default virtual display screen of the electronic device.

In some embodiments, the device may be configured to hide the default virtual display screen of the electronic device, which is equivalent to the display device cutting off the connection between the default virtual display screen and the display screen of the electronic device. In this way, the default virtual display screen is not displayed on the display screen of the electronic device.

During implementation, the device may modify the communication information between the default virtual display screen and the electronic device, such that the default virtual display screen is not displayed on the display screen of the electronic device. Alternatively, the device may respond to the instruction for a display driver interface, such that the default virtual display screen is not be displayed on the display screen of the electronic device.

In some embodiments, if the electronic device is a laptop computer or a desktop computer, the display driver interface may be an operable display driver interface in the operating system when the operating system is a Windows Work Station or a later operating system. For example, when the display drive interface is closed, the default virtual display screen may not be displayed on the display screen of the electronic device; and, when the display drive interface is turned on, the default virtual display screen may be displayed on the display screen of the electronic device.

202, dividing at least one underlying graphics sub-resource corresponding to the parameter of the split-screen instruction in the underlying graphics resource.

In some embodiments, the device may be configured to divide at least one underlying graphics sub-resource corresponding to the parameter of the split-screen instruction in the underlying graphics resource of the electronic device in response to the split-screen instruction. The underlying graphics resource may include memory resources corresponding to the virtual display screen, and may include the memory of the electronic device and the memory of the graphics card. In some embodiments, the split-screen instruction may be generated based on the driver, and the parameter of the split-screen instruction may include one or more of the number of generated virtual display screens, the relative positions between the virtual display screens, the shapes of the virtual display screens, the sizes of the virtual display screens, and the resolutions of the virtual display screens.

During implementation, the device may divide a number of at the least one underlying graphics sub-resources that is equal to the number of sub-screens corresponding to the split-screen instruction in the underlying graphics resources other than the underlying graphics resource corresponding to the default virtual display screen.

203, generating at least one virtual display screen based on the parameter corresponding to the split-screen instruction and the attribute information of the default virtual display screen of the electronic device.

In some embodiments, the device may be configured to determine the seize and/or resolution of the at least one virtual display screen based on the parameter corresponding to the split-screen instruction and the size and/or resolution of the default virtual display screen of the electronic device, and generate the at least one virtual display screen based on the size and/or resolution of the at least one virtual display screen. In some embodiments, the sum of the sizes of all virtual display screens may be less than or equal to the size of the default virtual display screen, and/or, the sum of the resolutions of all virtual display screens may be less than or equal to the size of the default virtual display screen.

In some embodiments, the default virtual display screen may be a virtual display screen corresponding to full screen display (i.e., when the screen is not split) of the electronic device based on the display screen. The attribute information of the default virtual display screen may include the size of the default virtual display screen and/or the resolution of the default virtual display screen. In some embodiments, the display screen of the electronic device may be a display (i.e., a hardware device) of the electronic device, the default virtual display screen may be a virtual display screen corresponding to the display screen, and the size and/or resolution of the default virtual display screen may be the same as the size and/or resolution of the display part included in the display screen.

In some embodiments, before the display device hides the default virtual display screen of the electronic device, in the operating system corresponding to the electronic device, a display setting part may display the icons of the default virtual display screen. After the display device hides the default virtual display screen of the electronic device, in the operating system corresponding to the electronic device, the display setting part may display the icons and/or the relative positions of the at least one virtual display screen.

Figure 3:
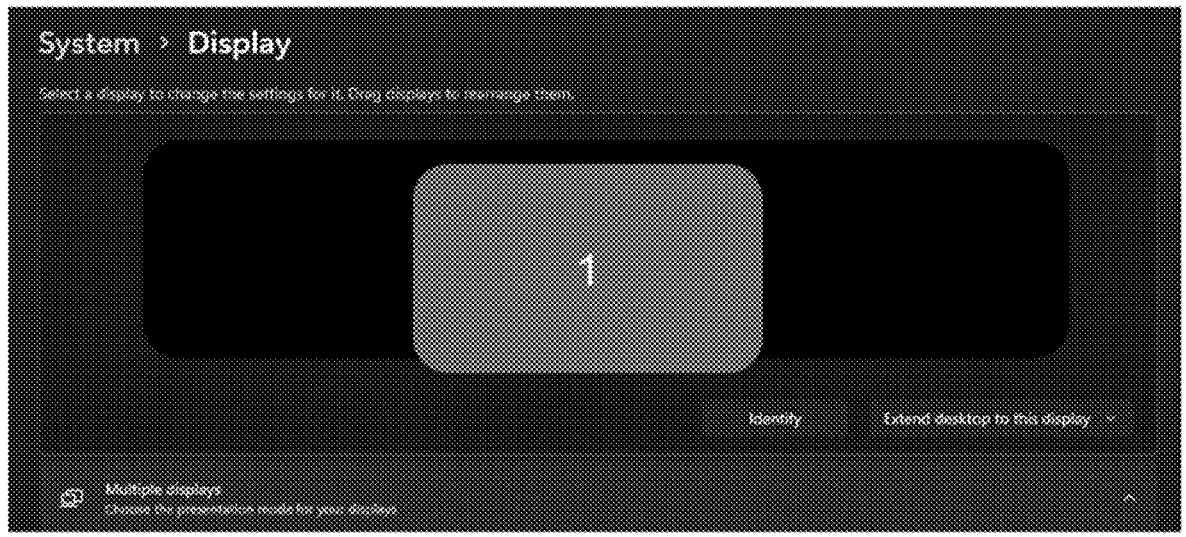
FIG. 3 is a schematic diagram of icons displayed in a display setting part before a default virtual display screen is hidden according to an embodiment of the present disclosure.
Figure 4:
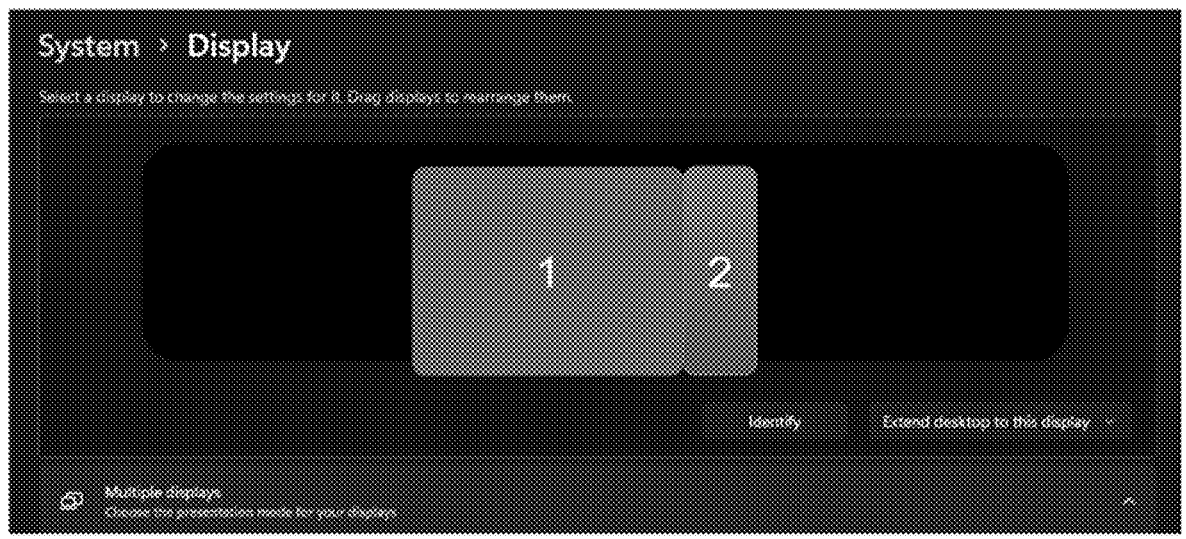
FIG. 4 is a schematic diagram of icons displayed in the display setting part after the default virtual display screen is hidden according to an embodiment of the present disclosure.

FIG. 3 is a schematic diagram of icons displayed in a display setting part before a default virtual display screen is hidden according to an embodiment of the present disclosure, and FIG. 4 is a schematic diagram of icons displayed in the display setting part after the default virtual display screen is hidden according to an embodiment of the present disclosure.

As shown in FIG. 3, before the default virtual display screen is hidden, the display setting part displays an icon corresponding to the default virtual display screen, where the aspect ratio of the icon is the same as the aspect ratio of the default virtual display screen. As shown in FIG. 4, after the default virtual display screen is hidden, the display device performs screen splitting based on the driver, the sum of the sizes of the two virtual display screens is equal to the size of the default virtual display screen, and the relative position between the icons corresponding to the two virtual display screens are displayed in the display setting part.

204, displaying the content in the at least one underlying graphics sub-resource on the display screen of the electronic device based on the attribute information of the at least one virtual display screen.

In some embodiments, the device may be configured to transfer the content in at least one underlying graphics sub-resource to the underlying graphics resource corresponding to the default virtual display screen; perform synthesize processing on the content in at least one underlying graphics sub-resource based on the relative position between the at least one virtual display screen, and the size and/or resolution of the at least one virtual display screen; and displaying the synthesized content on the display screen of the electronic device.

Figure 5:
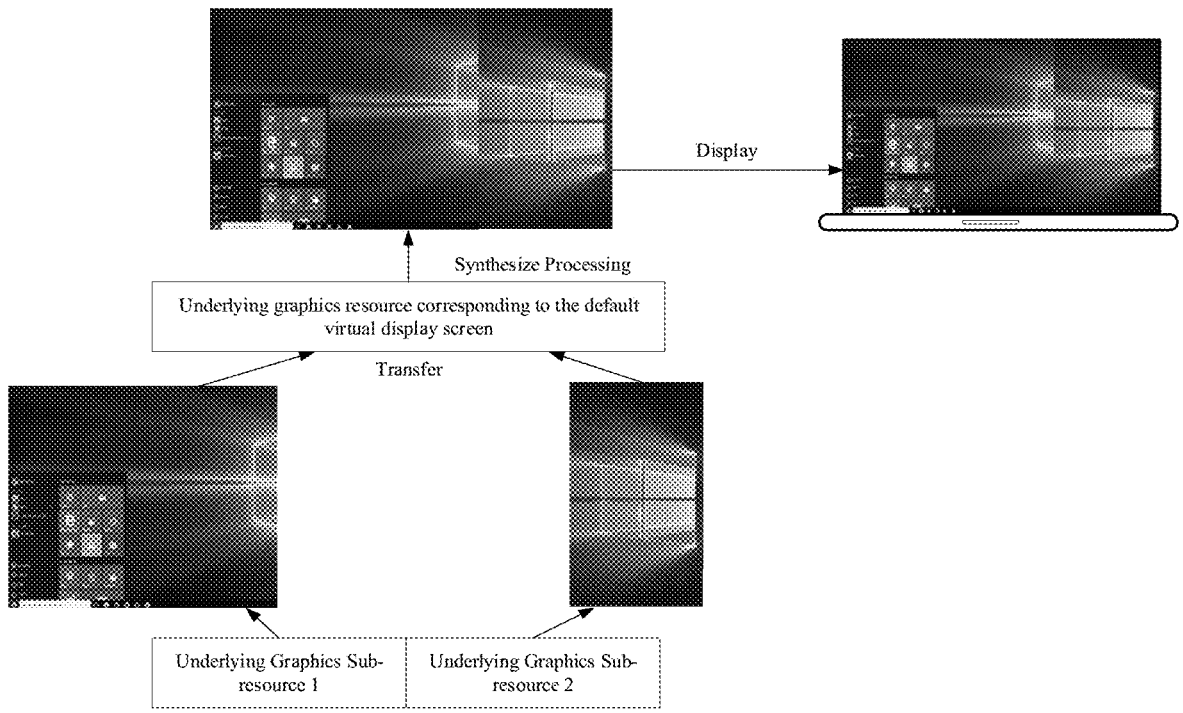
FIG. 5 is a schematic diagram of performing synthesize processing on content in at least one underlying graphics sub-resource according to an embodiment of the present disclosure.
Figure 6:
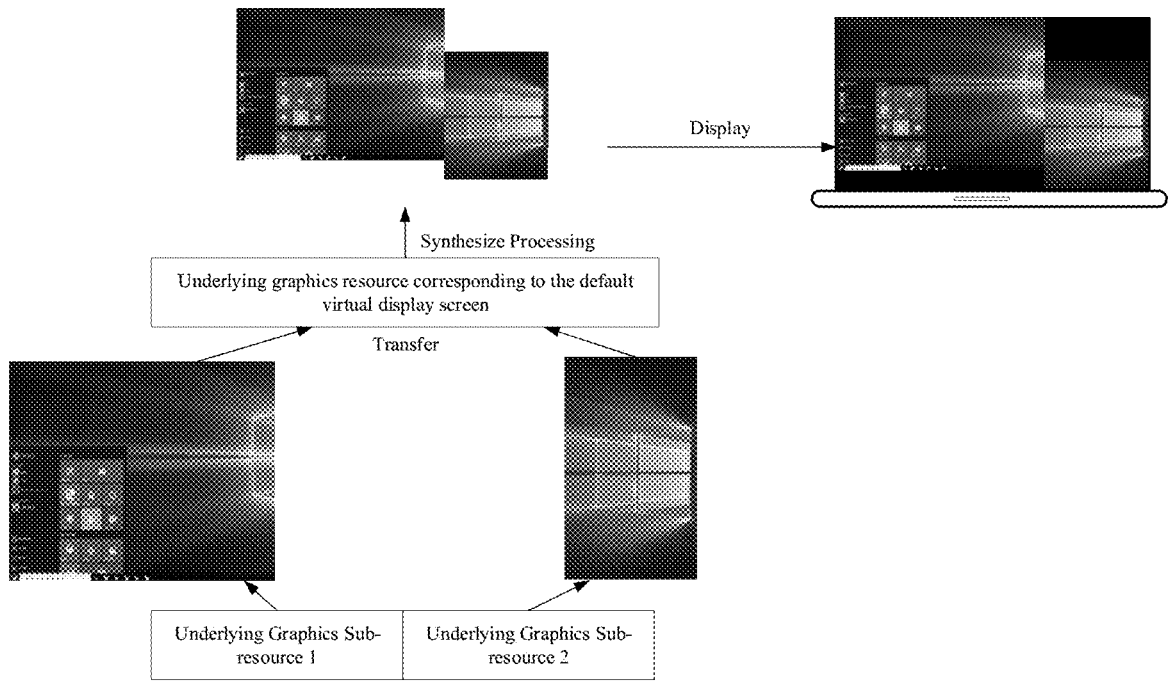
FIG. 6 is a schematic diagram of performing the synthesize processing on content in at least one underlying graphics sub-resource according to an embodiment of the present disclosure.

FIG. 5 is a schematic diagram of performing synthesize processing on content in at least one underlying graphics sub-resource according to an embodiment of the present disclosure, and FIG. 6 is a schematic diagram of performing the synthesize processing on content in at least one underlying graphics sub-resource according to an embodiment of the present disclosure.

As shown in FIG. 5, after the device hides the default virtual display screen of the electronic device, based on the parameter of the split-screen instruction (dividing two virtual display screens, and the sum of the sizes of the two virtual display screens is the same as the size of the default virtual display screen), an underlying graphics sub-resource 1 and an underlying graphics sub-resource 2 are divided in the underlying graphics resource. Then, at least one virtual display screen is generated based on the parameter of the split-screen instruction. Next, the content in the underlying graphics sub-resource 1 and the underlying graphics sub-resource 2 are transferred to the underlying graphics resource corresponding to the default virtual display screen. Subsequently, synthesize processing is performed on the content in at least one underlying graphics sub-resource based on the relative position between the at least one virtual display screen, and the size and/or resolution of the at least one virtual display screen. Finally, the synthesized content is displayed on the display screen of the electronic device.

As shown in FIG. 6, after the device hides the default virtual display screen of the electronic device, based on the parameter of the split-screen instruction (dividing two virtual display screens, and the sum of the sizes of the two virtual display screens is less than the size of the default virtual display screen), an underlying graphics sub-resource 1 and an underlying graphics sub-resource 2 are divided in the underlying graphics resource. Then, at least one virtual display screen is generated based on the parameter of the split-screen instruction. Next, the content in the underlying graphics sub-resource 1 and the underlying graphics sub-resource 2 are transferred to the underlying graphics resource corresponding to the default virtual display screen. Subsequently, synthesize processing is performed on the content in at least one underlying graphics sub-resource based on the relative position between the at least one virtual display screen, and the size and/or resolution of the at least one virtual display screen. Finally, the synthesized content is displayed on the display screen of the electronic device. In some embodiments, the if the sum of the sizes of the at least two virtual display screens is smaller than the size of the default virtual display screen, a solid color or background pattern may be displayed on the display screen in areas other than the areas corresponding to the at least two virtual display screens.

In some embodiments, the content in the at least one underlying graphics sub-resource may have a shared attribute, such that the content can be transferred from the at least one underlying graphics sub-resource to the underlying graphics resource corresponding to the default virtual display screen.

Consistent with the present disclosure, by hiding the default virtual display screen and dividing at least one underlying graphics sub-resource corresponding to the parameter of the split-screen instruction in the underlying graphics resource, generating at least one virtual display screen based on the parameter corresponding to the split-screen instruction and the attribute information of the default virtual display screen of the electronic device, and displaying the content in the at least one underlying graphics sub-resource on the display screen of the electronic device based on the attribute information of the at least one virtual display screen, the split-screen can be implemented on the display screen of the electronic device.

FIG. 7 is a flowchart of the display method according to an embodiment of the present disclosure. The method will be described in detail below.

In some embodiments, after performing the processes at 101 to 103, or the process at 201, or the process at 203, in the process of using the electronic device, the display method may further include the following process.

301, on the display screen of the electronic device, displaying the content corresponding to a first operation on any one of the virtual display screens.

In some embodiments, the device may receive the first operation for any one of the virtual display screens, and determine the underlying graphics sub-resource corresponding to the any one of the virtual display screens based on the first operation for the any one of the virtual display screens. The device may further store the content corresponding to the first operation to the underlying graphics sub-resource corresponding to any one of the virtual display screens, and display the content corresponding to the first operation in the underlying graphics sub-resource corresponding to the any one of the virtual display screens on the display screen of the electronic device.

FIG. 8 is a flowchart of the display method according to an embodiment of the present disclosure. The method will be described in detail below.

In some embodiments, after performing the processes at 101 to 103, or the process at 201, or the process at 203, in the process of using the electronic device, the display method may further include the following process.

401, adjusting display parameters of the at least two virtual display screens based on the attribute information of the content.

In some embodiments, when content corresponding to at least two virtual display screens is displayed on the display screen of the electronic device, the display parameters of the at least two virtual display screens may be adjusted based on the attribute information of the displayed content.

In some embodiments, the display parameters of the at least two virtual display screens may include the size and/or the resolution.

FIG. 9 is a schematic diagram of adjusting the display parameters of at least two virtual display screens based on attribute information of content according to an embodiment of the present disclosure.

As shown in FIG. 9(1), the size of the image window is smaller than the size of the virtual display screen where it is positioned, and the size and/or resolution of the two virtual display screens are the same as the parameters corresponding to the split-screen instruction. The size of the image window may be increased such that the size of the image window is larger than the size of the virtual display screen where it is positioned. At this time, the size and/or resolution of the two virtual display screens may be adjusted, the size of the virtual display screen where the image window is positioned may be increased, and the size of the other virtual display screen may be reduced.

In some application scenarios, such as sharing slides or sharing materials in a meeting, the first user may not want other uses to view the content on another virtual display screen (another split screen). However, in actual use cases, the first user may need to adjust the size of the displayed content such that other users can clearly view the displayed content. At this time, the display method provided in the embodiments of the present disclosure can be used. In this way, while the first user adjusts the size of the displayed content, the size and/or resolution of the at least two virtual display screens can be adaptively adjusted. In this way, the displayed content can be clearly displayed, and the privacy requirements of the first user can also be satisfied.

FIG. 10 is a flowchart of the display method according to an embodiment of the present disclosure.

In some embodiments, after performing the processes at 101 to 103, or the process at 201, or the process at 203, in the process of using the electronic device, the display method may further include the following process.

501, displaying the content on the at least two virtual display screens in response to the display position of the content.

In some embodiments, when the content corresponding to at least two virtual display screens is being displayed on the display screen of the electronic device, if the display position of the content is moved from one of the virtual display screens to between the at least two virtual display screens, the device may display the content on the at least two virtual display screens in response to the display position of the content.

FIG. 11 is a schematic diagram of displaying the content on at least two virtual display screens in response to the display position of the content according to an embodiment of the present disclosure.

As shown in FIG. 11(1), the size of the image window is smaller than the size of the virtual display screen where it is positioned, and the size and/or resolution of the two virtual display screens are the same as the parameters corresponding to the split-screen instruction. As shown in FIG. 11(2), the image window is moved to the direction of the other virtual display screen. At this time, the image window is simultaneously displayed on the at least two virtual display screens, and only part of the image window is displayed on the at least two virtual display screens.

In some application scenarios, the first user may want to adjust the position of the displayed content while keeping the at least two virtual display screens. At this time, the display method provided in the embodiments of the present disclosure can be used. In this way, while the first user adjusts the position where the content is being displayed, the at least two virtual display screens can also be retained to improve user experience.

Figure 12:
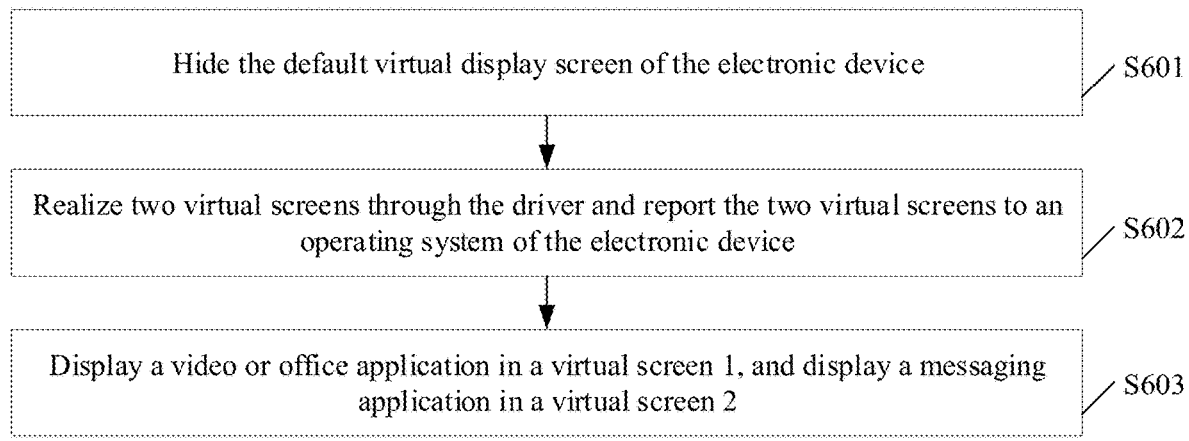
FIG. 12 is a flowchart of the display method according to an embodiment of the present disclosure.

FIG. 12 is a flowchart of the display method according to an embodiment of the present disclosure. The method will be described in detail below.

601, hiding the default virtual display screen of the electronic device.

The specific implementation process of 601 is the same as the implementation process of 201, which will not be repeated here. The default virtual display screen may be a physical screen of the electronic device, or a virtual display screen corresponding to the physical screen. After being hidden, the original physical screen cannot be seen in the display settings in the operating system of the electronic device (as shown in FIG. 3 and FIG. 4).

602, realizing two virtual screens through the driver and reporting the two virtual screens to the operating system of the electronic device.

In some embodiments, two virtual screens (virtual screen 1 and virtual screen 2) may be generated based on the parameter corresponding to the driver and the split-screen instruction, and the two virtual screens may be reported to the operating system of the electronic device.

603, displaying a video or an office application in the virtual screen 1, and displaying a messaging application in the virtual screen 2.

In some embodiments, when a user uses a video or office application (such as Word, Excel, PowerPoint, etc.), the display device may display the image frames (video streams) generated during the execution of the video or office application on the virtual screen 1 in real time through the VGA graphics card. When the user uses a messaging application, the image frames (video streams) generated during the execution of the messaging application may be displayed on the virtual screen 2 in real time through the VGA graphics card.

During implementation, the device may store the image frames (video streams) generated during the execution of the video or office application in the VGA graphics card memory corresponding to the virtual screen 1, and store the image frames (video streams) generated during the execution of the messaging application in the VGA graphics card memory corresponding to the virtual screen 2. The image frames in the VGA graphics card memory corresponding to the virtual screen 1 and the image frames in the VGA graphics card memory corresponding to the virtual screen 2 can be transferred and synthesized to the VGA graphics card memory corresponding to the physical screen. Subsequently, the synthesized image frame can be displayed on the display screen of the electronic device.

In this way, by using the display method provided in the embodiments of the present disclosure, when a user watches a video in a full screen mode (full screen of a video application), the messages in the messaging application can still be processed. In the slide show mode, the user can still use Microsoft Teams (an efficient office assistant application). When the screen needs to be shared in a meeting, the user can share only the virtual screen 1, such that other participants cannot view the content displayed on the virtual screen 2. In addition, the system corresponding to the electronic device (such as Windows) can also be displayed on the virtual screen 1, and the content projected by a terminal device can be displayed on the virtual screen 2, and the virtual screen 1 and the virtual screen will not interfere with each other. In addition, the size and/or ratio of the virtual screen 1 and the virtual screen 2 can also be adjusted based on the different needs of the user. For example, virtual screen 1 and virtual screen 2 may be the same size, and the user may perform a slide show on the virtual screen 1, and use the slide presenter mode on the virtual screen 2 to view notes.

Figure 13:
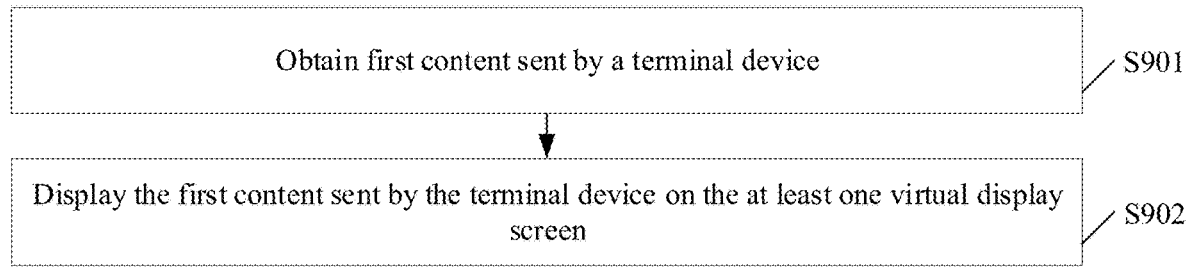
FIG. 13 is a flowchart of the display method according to an embodiment of the present disclosure.

FIG. 13 is a flowchart of the display method according to an embodiment of the present disclosure.

In some embodiments, after performing the processes at 101 to 103, or the process at 201, or the process at 203, in the process of using the electronic device, the display method may further include the following process.

901, obtaining first content sent by a terminal device.

In some embodiments, the display device may be configured to obtain the first content sent by the terminal device. In some embodiments, the terminal device may be a device other than the electronic device, and may be one or more of a smart phone, a personal tablet computer, a smart watch, a smart bracelet, and an augmented reality (AR) device.

In some embodiments, the display device may obtain the first content sent by the terminal device in a wired manner (e.g., a USB data cable) or in a wireless manner (e.g., a wireless network).

During implementation, the terminal device may be connected to the display device or the electronic device in a wired manner, and send the first content of the terminal device based on a data cable. Alternatively, the terminal device may be wirelessly connected to the display device or the electronic device in a wireless manner, and directly send the first content to the display device through Wi-Fi, or send the first content to a server, and the server may send the first content to the display device or the electronic device. If the electronic device receives the first content, the electronic device may send the first content to the display device, or the electronic device may send the first content to a corresponding underlying graphics sub-resource.

In some embodiments, the first content may be content displayed on the screen of the terminal device, and the first content may change with time or user operations. Correspondingly, the changed content may also be sent to the display device or the electronic device in a wired or wireless manner.

902, displaying the first content sent by the terminal device on the at least one virtual display screen.

In some embodiments, the display device may display the first content sent by the terminal device on any display screen included in the at least one virtual display screen based on a selection instruction.

During implementation, the display device may receive the first content (the first content may be directly sent by the terminal device to the display device; or the first content may also be sent by the terminal device to the electronic device, and then sent by the electronic device to the display device; or the first content may also be sent by the electronic device to the corresponding underlying graphics sub-resource after receiving the first content), send the first content to the corresponding underlying graphics sub-resource based on the selection instruction, and transfer the content in the at least one underlying graphics sub-resource corresponding to the at least one virtual display screen to the underlying graphics resource corresponding to the default virtual display screen. Subsequently, synthesize processing may be performed on the content in at least one underlying graphics sub-resource based on the relative position between the at least one virtual display screen, and the size and/or resolution of the at least one virtual display screen, and the synthesized content may be displayed on the display screen of the electronic device.

Figure 14:
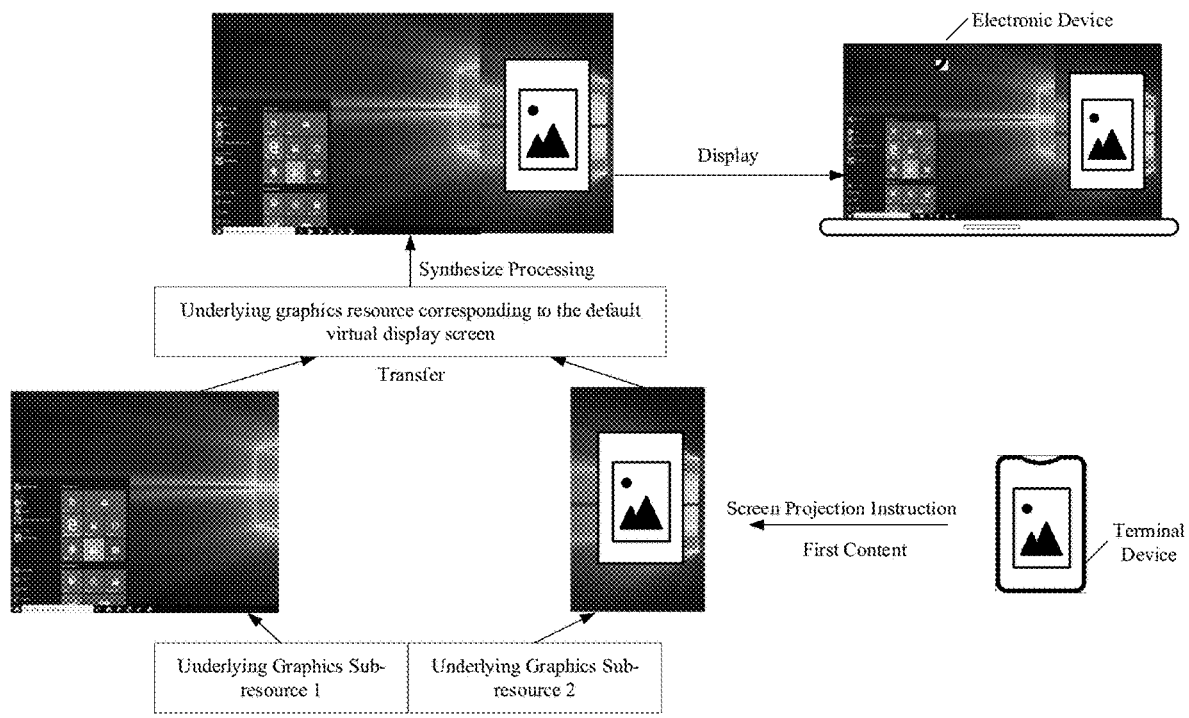
FIG. 14 is a schematic diagram of an application of the display method according to an embodiment of the present disclosure.

FIG. 14 is a schematic diagram of an application of the display method according to an embodiment of the present disclosure.

The embodiments of the present disclosure can be applied to a scenario where the content displayed on the screen of the terminal device is projected to the display device of the electronic device. In some embodiments, the split screen operation (the processes of 101 to 103, or the process at 201, or the process at 203) may be completed before the screen projection instruction, or the split screen operation may be completed based on the screen projection instruction. The screen projection instruction may be sent by the terminal device to the display device.

In the example shown in FIG. 14, the screen projection instruction is issued after the split screen operation. After the device hides the default virtual display screen of the electronic device based on the split-screen instruction, based on the parameter of the split-screen instruction (dividing two virtual display screens, and the sum of the sizes of the two virtual display screens is the same as the size of the default virtual display screen), an underlying graphics sub-resource 1 and an underlying graphics sub-resource 2 are divided in the underlying graphics resource. Then, at least one virtual display screen is generated based on the parameter of the split-screen instruction. Next, the first content sent by the terminal device is received and transferred to the underlying graphics sub-resource 2, and the content in the underlying graphics sub-resource 1 and the underlying graphics sub-resource 2 are transferred to the underlying graphics resource corresponding to the default virtual display screen. Subsequently, synthesize processing is performed on the content in at least one underlying graphics sub-resource based on the relative position between the at least one virtual display screen, and the size and/or resolution of the at least one virtual display screen. Finally, the synthesized content is displayed on the display screen of the electronic device.

In this way, the first content displayed on the display screen of the terminal device can be displayed on one of the split screens of the electronic device, thereby meeting the different needs of users using the terminal device and the electronic device, and improving the user experience.

Figure 15:
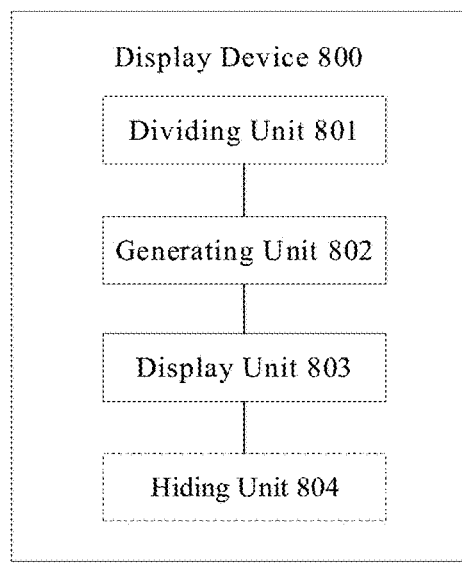
FIG. 15 is a schematic structural diagram of a display device according to an embodiment of the present disclosure.

FIG. 15 is a schematic structural diagram of a display device 800 according to an embodiment of the present disclosure. As shown in FIG. 15, the display device 800 includes a dividing unit 801, a generating unit 802, and a display unit 803.

The dividing unit 801 may be configured to divide at least one underlying graphics sub-resource corresponding to the parameter of the split-screen instruction in the underlying graphics resource.

The generating unit 802 may be configured to generate at least one virtual display screen based on the parameter corresponding to the split-screen instruction and the attribute information of the default virtual display screen of the electronic device.

The display unit 803 may be configured to display the content in the at least one underlying graphics sub-resource on the display screen of the electronic device based on the attribute information of the at least one virtual display screen.

In some embodiments, the display device 800 may further include a hiding unit 804.

The hiding unit 804 may be configured to hide the default virtual display screen of the electronic device.

In some embodiments, the hiding unit 804 may be configured to change the communication information between the default virtual display screen and the electronic device, such that the default virtual display screen is not displayed on the display screen of the electronic device. Alternatively, the hiding unit 804 may be configured to respond to an instruction for the display driver interface, such that the default virtual display screen is not displayed on the display screen of electronic device.

In some embodiments, the dividing unit 801 may be further configured to divide at least one underlying graphics sub-resource equal to the number of sub-screens corresponding to the split-screen instruction in the underlying graphics resource other than the underlying graphics resource corresponding to the default virtual display screen.

In some embodiments, the generating unit 802 may be further configured to determine the seize and/or resolution of the at least one virtual display screen based on the parameter corresponding to the split-screen instruction and the size and/or resolution of the default virtual display screen of the electronic device, and generate the at least one virtual display screen based on the size and/or resolution of the at least one virtual display screen. In some embodiments, the sum of the sizes of all virtual display screens may be less than or equal to the size of the default virtual display screen, and/or, the sum of the resolutions of all virtual display screens may be less than or equal to the size of the default virtual display screen.

In some embodiments, the display unit 803 may be further configured to transfer the content in the at least one underlying graphics sub-resource to the underlying graphics resource corresponding to the default virtual display screen; perform synthesize processing on the content in at least one underlying graphics sub-resource based on the relative position between the at least one virtual display screen, and the size and/or resolution of the at least one virtual display screen; and display the synthesized content on the display screen of the electronic device.

In some embodiments, the content in at least one underlying graphics sub-resource may have a shared attribute.

In some embodiments, the display unit 803 may be further configured to determine the underlying graphics sub-resource corresponding to the any one of the virtual display screens based on the first operation for the any one of the virtual display screens; store the content corresponding to the first operation to the underlying graphics sub-resource corresponding to any one of the virtual display screens; and display the content corresponding to the first operation in the underlying graphics sub-resource corresponding to the any one of the virtual display screens on the display screen of the electronic device.

In some embodiments, the display unit 803 may be further configured to adjust the display parameters of the at least two virtual display screens based on the attribute information of the displayed content when content corresponding to at least two virtual display screens is displayed on the display screen of the electronic device.

Figure 16:
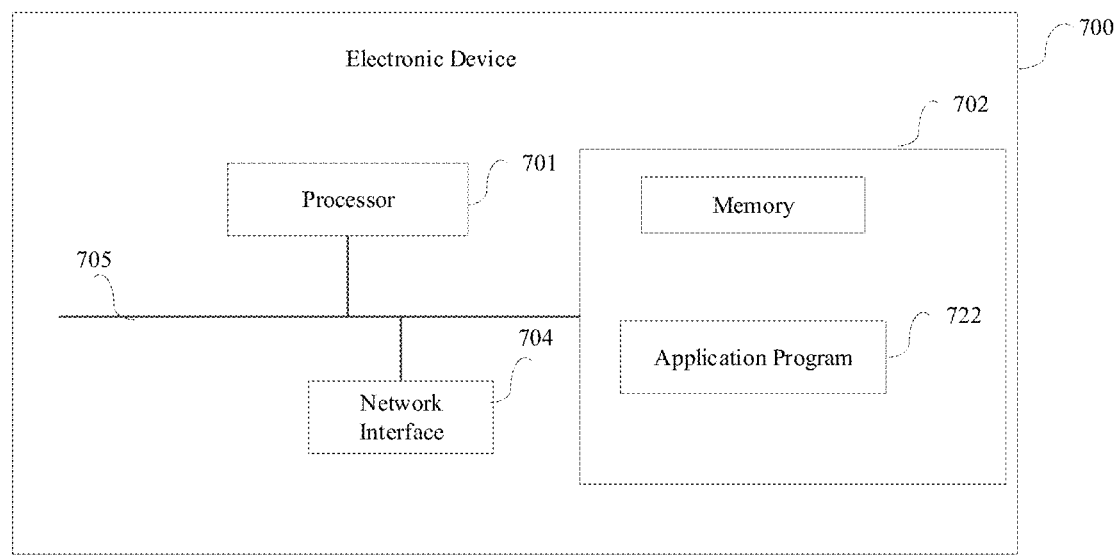
FIG. 16 is a schematic structural diagram of a hardware composition of an electronic device according to an embodiment of the present disclosure.

FIG. 16 is a schematic structural diagram of a hardware composition of an electronic device 700 according to an embodiment of the present disclosure. The electronic device may include a processor, a communication interface, a memory and a communication bus. The processor, communication interface, and memory may communicate with each other through the communication bus. The memory may be used to store a computer program, and the processor may be configured to execute the computer program stored in the memory to implement the display method described above.

The electronic device 700 shown in FIG. 16 includes at least one processor 701, a memory 702, at least one network interface 704. Various components in electronic device 700 are coupled together by a bus system 705. The bus system 705 is used to implement communication connection between these components. In addition to the data bus, the bus system 705 may also include a data bus, a power bus, a control bus, and a status signal bus. For the clarity of description, various buses are labeled as the bus system 705 in FIG. 16.

The memory 702 can be a volatile memory or a non-volatile memory, and can include the volatile memory and the nonvolatile memory. The non-volatile memory may be a read-only memory (ROM), a programmable read-only memory (PROM), or an erasable programmable read-only memory (EPROM), an electrically erasable programmable read-only memory (EEPROM), a ferromagnetic random-access memory (FRAM), a flash memory, a magnetic surface memory, a compact disc (CD), or a compact disc read-only memory (CD-ROM). The magnetic surface memory can be a disk storage or a tape storage. The volatile memory can be a random-access memory (RAM) that acts as an external cache. Various types of RAM can be used as the volatile memory. For example, the RAM may include such as a static random-access memory (SRAM), a synchronous static random-access memory (SSRAM), a dynamic random-access (SSRAM), a dynamic random-access memory (DRAM), a synchronous dynamic random-access memory (SDRAM), a double data rate synchronous dynamic random-access memory (DDRSDRAM), an enhancement synchronous dynamic random-access memory (ESDRAM), a sync link dynamic random-access memory (SLDRAM), a direct RAM bus random-access memory (DRRAM). The above are only examples of the memory 702. There may be other suitable types of memories.

The memory 702 can store various types of data to support the operation of the electronic device 700. The data may include the computer program, e.g., an application program 722, for operating on electronic device 700. A computer program for implementing the method embodiments of the present disclosure may be included in the application program 722.

The method described the foregoing embodiments of the present disclosure may be applied to the processor 701 or implemented by the processor 701. The processor 701 may be an integrated circuit chip with signal processing capabilities. In an implementation process, each step of the foregoing method may be completed by an integrated logic circuit of hardware or an instruction in a form of software in the processor 701. The processor 701 may be a general-purpose processor, a digital signal processor (DSP), or other programmable logic device, a discrete gate or transistor logic device, a discrete hardware component, etc. The processor 701 can implement or perform the various methods, steps, and logic blocks disclosed in the embodiments of the present disclosure. The general-purpose processor can be a microprocessor or any conventional processor, etc. The steps of the method disclosed in the embodiments of the present disclosure may be directly implemented by a hardware decoding processor, or may be performed by software modules or units, or performed by a combination of hardware and software modules/units in the decoding processor. The software module can be included in a storage medium. The storage medium may be in memory 702. The processor 701 can read information from and store information into the memory 702, to in conjunction with the hardware, perform the functions of the software modules/units.

In an exemplary embodiment, the electronic device 700 may be configured by one or more application specific integrated circuits (ASICs), DSPs, programmable logic devices (PLDs), complex programmable logic devices (CPLDs), field-programmable gate arrays (FPGAs), general purpose processors, controllers, micro controller units (MCUs), microprocessors, or other electronics components, which can implement the aforementioned method.

In addition, to the method and device embodiments described above, embodiments of the present disclosure may also be a computer program product having computer program instructions. The computer program instructions, when executed by a processor, can cause the processor to perform the steps described in the foregoing method embodiments.

The program code for carrying out the operations of embodiments of the present disclosure can be complied in any combination of one or more programming languages, which comprise object-oriented programming languages, such as Java, C++, etc., as well as conventional procedural programming language, such as "C" language or similar programming language. The program code may execute entirely on the user's computer, partly on the user's computer, as a stand-alone software package, partly on the user's computer and partly on a remote computer or entirely on the remote computer or server.

In addition, the embodiment of the present disclosure may also be a computer-readable storage medium, such as a computer-readable non-transitory storage medium, on which program instructions are stored. When executed by a processor, the program instructions can cause the processor to perform the steps described in the foregoing method embodiments.

The computer-readable storage medium may adopt any combination of one or more readable media. The readable medium may be a readable signal medium or a readable storage medium. The readable storage medium may comprise, but is not limited to, a system, a device, or an equipment of an electrical, magnetic, optical, electromagnetic, infrared, or semiconductor, or a combination of any of the above. More specific examples (non-exhaustive list) of readable storage media comprise: electrical connections with one or more wires, portable disks, hard disks, random access memory (RAM), read only memory (ROM), erasable type programmable read-only memory (EPROM or flash memory), optical fiber, portable compact disk read-only memory (CD-ROM), optical memory, magnetic memory, or any suitable combination of the above.

The basic principles of the present disclosure are described above in conjunction with specific embodiments. However, it should be pointed out that the advantages, merits, effects, etc. mentioned in the present disclosure are merely examples and not limitations, and these cannot be considered as essential for each embodiment of the present disclosure. In addition, specific details disclosed hereinabove are only for the purpose of explanation and ease of understanding, rather than limitations, and it is not necessary for the present disclosure to be implemented by using the specific details hereinabove.

The block diagrams of the device, apparatus, equipment, and systems involved in the present disclosure are merely illustrative examples and are not intended to require or imply that they must be connected, arranged, and configured in the manner shown in the block diagrams. As those skilled in the art will recognize, these device, apparatus, equipment, and systems can be connected, arranged, and configured in any manner. Terms such as "comprising", "including", "having", etc. are to be construed in an inclusive sense, meaning "comprising but not limited to", and can be used interchangeably. The terms "or" and "and" used herein refer to the term "and/or" and can be used interchangeably, unless the context clearly indicates otherwise. The term "such as" used herein refers to the phrase "such as but not limited to", and can be used interchangeably.

In addition, in the apparatuses, devices and methods of the present disclosure, each component or each step can be decomposed and/or recombined. These decomposed and/or recombined ones should be regarded as equivalent solutions of the present disclosure.

The above description of the disclosed aspects is provided to enable a person skilled in the art to achieve or make use of the present disclosure. Various modifications to these aspects are very obvious to those skilled in the art, and the general principles defined herein can be applied to other aspects without departing from the scope of the present disclosure. Therefore, the present disclosure is not intended to be limited to the aspects shown herein, but shall be expounded in accordance with the broadest scope consistent with the principles and novel technical features disclosed herein.

The above description has been given for the purposes of illustration and description. However, the embodiments of the present disclosure are not intended to be limited to the forms disclosed herein. Although a number of example aspects and embodiments have been discussed above, those skilled in the art will make certain variations, modifications, changes, additions, and sub-combinations thereof.

What is claimed is:

1. A display method comprising:
    dividing at least one underlying graphics sub-resource corresponding to a parameter of a split-screen instruction in an underlying graphics resource;
    generating at least one virtual display screen based on the parameter corresponding to the split-screen instruction and attribute information of a default virtual display screen of an electronic device, including:
        determining size and/or resolution of the at least one virtual display screen based on the parameter corresponding to the split-screen instruction and the size and/or resolution of the default virtual display screen of the electronic device; and
        generating the at least one virtual display screen based on the size and/or resolution of the at least one virtual display screen, wherein:
            a sum of the sizes of all virtual display screens is less than or equal to the size of the default virtual display screen, and/or the sum of the resolutions of all virtual display screens is less than or equal to the size of the default virtual display screen; and
    displaying content in the at least one underlying graphics sub-resource on a display screen of the electronic device based on the attribute information of the at least one virtual display screen.

2. The method of claim 1, wherein before dividing the at least one underlying graphics sub-resource corresponding to the parameter of the split-screen instruction in the underlying graphics resource, the method further comprises:
    hiding the default virtual display screen of the electronic device.

3. The method of claim 2, wherein hiding the default virtual display screen of the electronic device includes:
    changing communication information between the default virtual display screen and the electronic device to cause the default virtual display screen not to be displayed on the display screen of the electronic device; or,
    responding to an instruction to a display driver interface to cause the default virtual display screen not to be displayed on the display screen of the electronic device.

4. The method of claim 1, wherein dividing the at least one underlying graphics sub-resource corresponding to the parameter of the split-screen instruction in the underlying graphics resource includes:
    dividing the at least one underlying graphics sub-resource equal to a number of sub-screens corresponding to the split-screen instruction in the underlying graphics resources other than the underlying graphics resource corresponding to the default virtual display screen.

5. The method of claim 1, wherein displaying the at least one virtual display screen and the content in the at least one underlying graphics sub-resource on the display screen of the electronic device includes:
    transferring the content in the at least one underlying graphics sub-resource to the underlying graphics resource corresponding to the default virtual display screen;
    performing synthesize processing on the content in the at least one underlying graphics sub-resource based on a relative position between the at least one virtual display screen and the size and/or resolution of the at least one virtual display screen; and
    displaying the synthesized content on the display screen of the electronic device.

6. The method of claim 1 further comprising:
    obtaining first content sent by a terminal device; and
    displaying the first content sent by the terminal device on the at least one virtual display screen.

7. The method of claim 1 further comprising:
    determining the underlying graphics sub-resource corresponding to any one of the virtual display screens based on a first operation on any one of the virtual display screens;
    storing content corresponding to the first operation to the underlying graphics sub-resource corresponding to any one of the virtual display screens; and
    displaying the content corresponding to the first operation in the underlying graphics sub-resource corresponding to any one of the virtual display screens on the display screen of the electronic device.

8. The method of claim 1 further comprising:
    adjusting display parameters of at least two virtual display screens based on the attribute information of the displayed content when the content corresponding to the at least two virtual display screens is displayed on the display screen of the electronic device.

9. A display device comprising:
    a dividing unit configured to divide at least one underlying graphics sub-resource corresponding to a parameter of the split-screen instruction in an underlying graphics resource;
    a generating unit configured to generate at least one virtual display screen based on the parameter corresponding to the split-screen instruction and attribute information of a default virtual display screen of an electronic device, including:
        determining size and/or resolution of the at least one virtual display screen based on the parameter corresponding to the split-screen instruction and the size and/or resolution of the default virtual display screen of the electronic device; and
        generating the at least one virtual display screen based on the size and/or resolution of the at least one virtual display screen, wherein:

a sum of the sizes of all virtual display screens is less than or equal to the size of the default virtual display screen, and/or the sum of the resolutions of all virtual display screens is less than or equal to the size of the default virtual display screen; and a display unit configured to display content in the at least one underlying graphics sub-resource on a display screen of the electronic device based on the attribute information of the at least one virtual display screen.

10. The device of claim 9 further comprising:
a hiding unit configured to hide the default virtual display screen of the electronic device.

11. The device of claim 10, wherein the hiding unit is further configured to:
change communication information between the default virtual display screen and the electronic device to cause the default virtual display screen not to be displayed on the display screen of the electronic device; or,
respond to an instruction to a display driver interface to cause the default virtual display screen not to be displayed on the display screen of the electronic device.

12. The device of claim 9, wherein the dividing unit is further configured to:
divide the at least one underlying graphics sub-resource equal to a number of sub-screens corresponding to the split-screen instruction in the underlying graphics resources other than the underlying graphics resource corresponding to the default virtual display screen.

13. The device of claim 9, wherein the display unit is further configured to:
transfer the content in the at least one underlying graphics sub-resource to the underlying graphics resource corresponding to the default virtual display screen;
perform synthesize processing on the content in the at least one underlying graphics sub-resource based on a relative position between the at least one virtual display screen and the size and/or resolution of the at least one virtual display screen; and
display the synthesized content on the display screen of the electronic device.

14. The device of claim 9, wherein the display unit is further configured to:
determine the underlying graphics sub-resource corresponding to any one of the virtual display screens based on a first operation on any one of the virtual display screens;
store content corresponding to the first operation to the underlying graphics sub-resource corresponding to any one of the virtual display screens; and
display the content corresponding to the first operation in the underlying graphics sub-resource corresponding to any one of the virtual display screens on the display screen of the electronic device.

15. The device of claim 9, wherein the display unit is further configured to:
adjust display parameters of at least two virtual display screens based on the attribute information of the displayed content when the content corresponding to the at least two virtual display screens is displayed on the display screen of the electronic device.

16. A non-transitory computer-readable storage medium containing computer-executable instructions for, when executed by one or more processors, performing a display method, the method comprising:
dividing at least one underlying graphics sub-resource corresponding to a parameter of a split-screen instruction in an underlying graphics resource;
generating at least one virtual display screen based on the parameter corresponding to the split-screen instruction and attribute information of a default virtual display screen of an electronic device, including:
determining size and/or resolution of the at least one virtual display screen based on the parameter corresponding to the split-screen instruction and the size and/or resolution of the default virtual display screen of the electronic device; and
generating the at least one virtual display screen based on the size and/or resolution of the at least one virtual display screen, wherein:
a sum of the sizes of all virtual display screens is less than or equal to the size of the default virtual display screen, and/or the sum of the resolutions of all virtual display screens is less than or equal to the size of the default virtual display screen; and
displaying content in the at least one underlying graphics sub-resource on a display screen of the electronic device based on the attribute information of the at least one virtual display screen.

17. The non-transitory computer-readable storage medium of claim 16, wherein before dividing the at least one underlying graphics sub-resource corresponding to the parameter of the split-screen instruction in the underlying graphics resource, the method further comprises:
hiding the default virtual display screen of the electronic device.

18. The non-transitory computer-readable storage medium of claim 17, wherein hiding the default virtual display screen of the electronic device includes:
changing communication information between the default virtual display screen and the electronic device to cause the default virtual display screen not to be displayed on the display screen of the electronic device; or,
responding to an instruction to a display driver interface to cause the default virtual display screen not to be displayed on the display screen of the electronic device.

* * * * *